US012637240B2

(12) United States Patent
Werner et al.

(10) Patent No.: US 12,637,240 B2
(45) Date of Patent: May 26, 2026

(54) CHARGING STATION AND COMBINED CHARGING STATION

(71) Applicant: INNOTEC LIGHTWEIGHT ENGINEERING & POLYMER TECHNOLOGY GMBH, Goslar (DE)

(72) Inventors: Jens Werner, Wilsdruff STT Kesselsdorf (DE); Phil Pezus, Wilsdruff STT Kesselsdorf (DE); Matthias Bieler, Wilsdruff STT Kesselsdorf (DE); Florian Franke, Wilsdruff STT Kesselsdorf (DE)

(73) Assignee: GermaniumTech GmbH, Dresden (DE)

( * ) Notice: Subject to any disclaimer, the term of this patent is extended or adjusted under 35 U.S.C. 154(b) by 1632 days.

(21) Appl. No.: 16/772,233

(22) PCT Filed: Dec. 13, 2018

(86) PCT No.: PCT/DE2018/101021
§ 371 (c)(1),
(2) Date: Jan. 11, 2021

(87) PCT Pub. No.: WO2019/114888
PCT Pub. Date: Jun. 20, 2019

(65) Prior Publication Data
US 2021/0206511 A1 Jul. 8, 2021

(30) Foreign Application Priority Data

Dec. 15, 2017 (DE) .......................... 102017130251.4
Dec. 15, 2017 (DE) .......................... 102017130252.2
(Continued)

(51) Int. Cl.
B64U 80/25 (2023.01)
B60L 53/00 (2019.01)
(Continued)

(52) U.S. Cl.
CPC .............. B64U 80/25 (2023.01); B60L 53/00 (2019.02); B60L 53/16 (2019.02); B60L 53/31 (2019.02);
(Continued)

(58) Field of Classification Search
CPC ... B64U 80/25; B64F 1/30; B64F 1/22; B60L 53/00
(Continued)

(56) References Cited

U.S. PATENT DOCUMENTS 9,284,062 B2 * 3/2016 Wang ..................... G05D 1/654
9,505,493 B2 11/2016 Borko
(Continued)

FOREIGN PATENT DOCUMENTS

CN 107176047 A 9/2017
DE 102014112480 A1 * 3/2016 ......... G06Q 10/0836
(Continued)

OTHER PUBLICATIONS

U.S. Appl. No. 16/772,217, filed Jun. 12, 2020.
(Continued)

*Primary Examiner* — Richard V Muralidar
(74) *Attorney, Agent, or Firm* — Abel Schillinger, LLP

(57) ABSTRACT

Disclosed is a charging station (2) for a vertical take-off and landing aircraft (1) comprising one or more energy stores, the station having a charging device for transferring electrical energy to the energy store or stores. Also disclosed is a combined charging station (12) for vertical take-off and landing aircraft, each aircraft comprising one or more energy stores, the combined charging station (12) having multiple charging stations.

19 Claims, 5 Drawing Sheets

(30) Foreign Application Priority Data

| Dec. 15, 2017 | (DE) | .......................... | 102017130253.0 |
| Dec. 15, 2017 | (DE) | .......................... | 102017130254.9 |
| Dec. 15, 2017 | (DE) | .......................... | 102017130255.7 |

(51) Int. Cl.

| | |
| --- | --- |
| B60L 53/16 | (2019.01) |
| B60L 53/31 | (2019.01) |
| B60L 53/36 | (2019.01) |
| B60L 53/50 | (2019.01) |
| B64C 7/00 | (2006.01) |
| B64C 21/02 | (2006.01) |
| B64C 29/00 | (2006.01) |
| B64D 9/00 | (2006.01) |
| B64F 1/00 | (2006.01) |
| B64F 1/22 | (2024.01) |
| B64F 1/30 | (2006.01) |
| B64F 1/36 | (2017.01) |
| B64U 10/16 | (2023.01) |
| B64U 20/40 | (2023.01) |
| B64U 30/12 | (2023.01) |
| B64U 50/31 | (2023.01) |
| H02J 7/00 | (2006.01) |
| B64C 1/00 | (2006.01) |
| B64U 30/20 | (2023.01) |
| B64U 50/19 | (2023.01) |
| B64U 101/61 | (2023.01) |

(52) U.S. Cl.

CPC .............. *B60L 53/36* (2019.02); *B60L 53/50* (2019.02); *B64C 7/00* (2013.01); *B64C 21/02* (2013.01); *B64C 29/0016* (2013.01); *B64D 9/00* (2013.01); *B64F 1/00* (2013.01); *B64F 1/22* (2013.01); *B64F 1/30* (2013.01); *B64F 1/362* (2013.01); *B64U 10/16* (2023.01); *B64U 20/40* (2023.01); *B64U 30/12* (2023.01); *B64U 50/31* (2023.01); *H02J 7/0013* (2013.01); *B60L 2200/10* (2013.01);

*B64C 2001/0072* (2013.01); *B64U 30/20* (2023.01); *B64U 50/19* (2023.01); *B64U 2101/61* (2023.01)

(58) Field of Classification Search

USPC ......................................................... 320/115

See application file for complete search history.

(56) References Cited

U.S. PATENT DOCUMENTS

| | | | | |
| --- | --- | --- | --- | --- |
| 9,527,605 | B1 | | 12/2016 | Gentry et al. |
| 9,777,502 | B2 * | | 10/2017 | Curlander ............... B64F 1/025 |
| 9,840,327 | B1 * | | 12/2017 | Frank ........................ B64F 1/22 |
| 9,957,048 | B2 * | | 5/2018 | Gil ........................ G06Q 10/083 |
| 10,040,578 | B2 * | | 8/2018 | Miller .................... B64U 80/25 |
| 11,034,449 | B2 * | | 6/2021 | Bei ......................... B64U 70/92 |
| 11,767,131 | B2 * | | 9/2023 | Scherz .................. H02J 7/0042 |
| | | | | 244/114 R |
| 2015/0012154 | A1 | | 1/2015 | Senkel et al. |
| 2016/0009413 | A1 | | 1/2016 | Lee et al. |
| 2016/0039542 | A1 * | | 2/2016 | Wang ...................... B60L 53/52 |
| | | | | 244/114 R |
| 2016/0364989 | A1 | | 12/2016 | Speasl et al. |
| 2017/0175413 | A1 * | | 6/2017 | Curlander ................. B64F 1/10 |
| 2017/0247120 | A1 * | | 8/2017 | Miller .................... B64U 20/83 |
| 2017/0316375 | A1 * | | 11/2017 | Gil ........................ B65G 1/0435 |
| 2019/0055018 | A1 * | | 2/2019 | Bei ......................... B64U 70/92 |

FOREIGN PATENT DOCUMENTS

| | | | |
| --- | --- | --- | --- |
| EP | 3482618 | A1 | 5/2019 |
| WO | 201324300 | A1 | 8/2013 |
| WO | 2017081550 | A1 | 5/2017 |

OTHER PUBLICATIONS

U.S. Appl. No. 16/772,213, filed Jun. 12, 2020.
U.S. Appl. No. 16/772,228, filed Jun. 12, 2020.
U.S. Appl. No. 16/772,225, filed Jun. 12, 2020.

* cited by examiner

CHARGING STATION AND COMBINED CHARGING STATION

BACKGROUND OF THE INVENTION

Field of the Invention

The invention relates to a charging station for a vertical take-off and landing aircraft as well as a combined charging station.

Discussion of Background Information

Aircraft for transporting people and/or freight are becoming increasingly important as they represent quick transportation regardless of infrastructure such as roads, rails, bridges, tunnels, etc. This is particularly applicable to smaller aircraft that can take-off and land vertically and therefore do not require a runway.

From WO 2013/124300 there is known an example of an aircraft that has several propellers arranged in a sector along with their assigned electric motors. An energy store is located in the aircraft's framework structure to supply the electric motors with power, such as accumulators, super capacitors, or fuel cells. In addition, there is also an energy converter for providing electrical energy, for example be a combustion engine with a generator or another energy converter such as a range extender, which continues to charge up the energy store during flight.

The disadvantage is that the energy store, the energy converter, and the required fuel for the energy converter increase the mass of the aircraft, having an adverse effect on the flight characteristics of the aircraft and also increasing its energy consumption.

Furthermore, the energy converter and the fuel are a source of danger and are therefore a safety risk. Furthermore, energy efficiency is limited as decentralised conversion of fuel into electrical energy and the storage thereof is also provided. Use of electrical energy from renewable sources is either not possible or only possible to a limited extent, at best by providing fuel from renewable raw materials.

The object of the invention is therefore to specify an option that makes charging the energy store in an aircraft fast and safe, whilst also reducing the aircraft's energy consumption. Desirably, charging would also be possible using renewable energy sources.

This object is achieved by the subject matters of the independent claims. Other advantageous effects of the invention are stated in the sub-claims.

SUMMARY OF THE INVENTION

A charging station according to the invention for a vertical take-off and landing aircraft with one or several energy stores, has a charging device for transferring electrical energy to the energy store or stores, such as rechargeable accumulators or super capacitors, of the aircraft.

In order to charge the electrical energy in the energy store or stores, the aircraft can land on or next to the charging station and then take off from the charging station once the charging process is complete.

The charging station is preferably designed as a stationary charging station, in other words in a fixed location. However, the charging station can also be designed as a mobile, portable charging station if designed to be moved using a conveyor.

The charging station can be integrated into a take-off charging station for a vertical take-off and landing aircraft used for transporting people and/or freight, or integrated into another transport and logistics system for aircraft, or can be connected in the proximity of a take-off charging station or a transport and logistics system.

The charging station can preferably be integrated into or connected to existing infrastructure, such as a building, transportation objects such as bus stops, or street lighting.

The vertical take-off and landing (VTOL) aircraft can be designed for transporting people and/or freight.

The aircraft can have an appropriate transport module for this purpose.

It can have an appropriate flight module for driving the vertical take-off and landing aircraft.

The transport module can be connected to the flight module such that it can be coupled and decoupled. As a result, the flight module can be independently capable of flight and optionally connected to various transport modules.

If the aircraft has this type of modular design, the charging station can be designed in accordance with various embodiments for an aircraft flight module, the charging device being designed for transferring electrical energy to the energy store or stores of the flight module.

As a result, the aircraft's flight module can autonomously land on or next to the charging station, the energy store of the flight module can be electrically charged, and the flight module can then take off once again.

The charging station preferably has a charging platform on which the aircraft is parked or the flight module is stored during charging.

The charging facility can be fastened on or next to the charging platform. The charging platform can, for example, have at least the same spatial dimensions of the aircraft or flight module.

The charging station can preferably be designed and arranged such that it can be accessed from several directions. As an example, the charging station can be designed as a structure on a lighting column, pillar, or roof. Thereby the charging station can be accessed from various horizontal and vertical directions, i.e. the aircraft or the flight module can approach the charging station from different directions and land on the charging station, and take off from the charging station in different directions. Time-consuming landing and take-off procedures using predefined air corridors are therefore avoided.

The charging station can have one or more positioning devices for holding, fixing, and aligning the aircraft, for example for holding, fixing, and aligning an aircraft flight module. The positioning device(s) can be fastened either on or next to the charging platform.

Landing of the aircraft or flight module can optionally take place such that the aircraft or flight module approaches the charging station and when reaching a predefined approach point, it is detected by the positioning device or devices on the charging station.

The positioning device(s) can have one or several booms with gripper and/or support devices such as in the form of moving gripper arms, such as bar-shaped single or multi-jointed gripper arms, in the form of variable linear units or similar multi-axis, mechanical assemblies (e.g., industrial robots). Optionally, the positioning device(s) can be variable in terms of length, i.e. extendible. A change of length can, for example, be achieved by pushing several segments of the positioning element into one another telescopically. As a result, the positioning device(s) can be adapted to aircraft or flight modules of different geometrical designs so that various aircraft or flight modules can be detected, aligned, and parked on the charging platform of the charging station.

Alternatively or cumulatively, gripper and/or support devices on the positioning device can be used as a support and for fixing the aircraft or flight module when using a charging platform.

The positioning device(s) can be used to align the aircraft or flight module such that it is possible to connect it to the charging device.

Once the charging process has completed, the aircraft or flight module can take off directly from the charging platform or from the gripper and/or support devices on the positioning device.

Alternatively, aircraft or flight modules can be stored temporarily in or at the charging station, for example in preparation or follow-up to a charging process.

The positioning device(s) can preferably be arranged such that these rise upwards diagonally so that there is a safety clearance between the positioned aircraft or flight module and the platform of the charging station. For example, the positioning device(s) can run at an angle of approx. 45° upwards.

A flight module support structure can be detected by the positioning device(s) in a charging station that is particularly suitable for charging the electric energy store of an aircraft flight module.

The flight module can have multiple drive units arranged on a support structure, whereby the support structure has support beams connected to each other at intersections and whereby each drive unit has an electric motor and a propeller that is connected to the electric motor in mechanical linkage. The drive units can be optionally arranged in a plane.

The support structure can have radially, axially and tangentially arranged support beams, preferably straight or curved, which can be connected, for example, via connectors assigned to the support structure, for example T-joints, together at intersections and, if applicable, to a central unit that is centrally located in the support structure.

The support beams can, for example, be arranged such that they form a level, hexagonally braced support structure. To do this, six support beams can be arranged radially and evenly such that two adjacent radially arranged support beams are at an angle of approximately 60°.

The flight module has a central unit that may preferably be arranged centrally. The central unit can, for example, be a housing in the form of a hemisphere or an ellipsoid. For example, the central unit can be formed from two halves that are connected to each other using screws. Openings can be provided for maintenance and for carrying out minor repairs. The central unit can also be designed to accommodate support beams that are part of the support structure, for example whereby support beams in the support structure are attached to the central unit at one end and are arranged radially emanating outwards from the central unit.

The central unit can have technical function units such as control, orientation and/or communication technology and/or a charging module. An integrated charging module can have an energy store, for example in the form of rechargeable accumulators or super capacitors, a charging device and/or solar cells. The charging device can be designed to transfer electrical energy from an external charging station, such as the charging station according to the invention, to the energy store or stores.

The flight module can have a coupling device for connecting the transport module to the flight module. In other words, the coupling device is designed to couple and decouple a transport module. The coupling device can preferably be arranged in the center of the central unit.

This coupling device can also be used for the electrical connection of the flight module to a charging device on the charging station.

The charging device of the charging station according to the invention serves to transfer electrical energy to the energy store of the aircraft or the flight module. For this purpose, it can have current conducting cables with suitable electric connectors, for example media connectors that can be plugged/coupled. Alternatively, or additionally, the charging device can be designed for inductive charging of the aircraft or flight module.

The charging device can be connected to the aircraft or the flight module from a central, i.e. midpoint, of the charging station.

If the flight module coupling device is to be usable for an electrical connection to the charging device, the coupling device can be designed for the electrical connection of the charging device on the charging station and the charging device of the charging station can have a corresponding coupling counterpart that can be coupled to the coupling device of the flight module, such that electrical energy is transferred to the energy store or stores of the flight module via the coupling device and such that the energy stores of the flight module can be charged.

According to various embodiments, the charging device can have a flexible connector for different connections with the aircraft or flight module.

This enables local adjustment of the charging device connector so that energy stores of aircraft or flight modules of different geometrical designs can be charged.

To form a variable connection, the charging device can have a flexible connector, for example a telescopic boom with multiple segments and an internal cable, for example. By pushing multiple segments of the boom into one another, it is possible to create various lengths of the charging device connector.

To form a further variable connector, the charging device can be designed as a flexible connector with a jointed rod with, for example multiple jointed arms that are linked together. As a result, for example, it is possible to create a variable length and radius of the connector on the charging device.

To form a further variable connector, the charging device can be designed as a flexible connector with an elastic hose with, for example, an internal cable. Variations in length are possible as a result of winding or unwinding the hose.

The connector can also have a jointed connection to the central connection point of the charging device on the charging station in order to further improve the flexibility of connection options to the energy stores of aircraft or flight modules.

Alternatively, charging can take place via induction.

As well as transferring electrical energy, the charging device can also be used to transfer data to the aircraft or flight module. The charging device can have a data cable for this purpose.

Optionally, the charging station can have technical function units such as control, orientation and/or communication technology.

For example, the orientation technology can be designed to determine the position of the flight module using location signals, e.g. of a global navigation satellite system such as GPS, Galileo, GLONASS, Beidou etc., and also to determine and monitor the flight path and destination of the flight module.

The orientation technology can also include systems that either individually or in combination (optical, ultrasound, induction, eddy current) support take-off/landing as well as coupling/decoupling to the charging station via sensors that have different operating principles.

Communication technology can be designed for internal and/or external communications, whereby internal communication means communication with modules that are provided directly for use with the charging station, such as communication for the purpose of communication between the aircraft, flight module, and charging station.

External communication means communication regarding flight permits, flight path, location, etc. with air traffic control or exchanging information with meteorological services.

For example, communication technology can be designed to issue a report on the status of the charging station, such as a need for maintenance or repair or to report that a charging station is unoccupied.

In accordance with various embodiments, the charging station can be connected to a power grid, preferably to a high-voltage power grid. In this case, an infrastructure connection in the form of a connection to a local power grid is used and electrical energy is transferred directly from the power grid to the energy store. Depending on the source of the electrical energy supplied to the power grid, e.g. solar cells or wind turbines, renewable energy sources can be used for both charging the energy store and also then for operating the flight module. Connection to a high-voltage power grid offers the benefit of particularly fast charging of the energy store, thereby improving the flexibility in use of the flight module.

In accordance with further embodiments, the positioning device(s) can have one or several gripper and/or support devices. These can, for example, be designed in the form of a forked mounting fixture(s) for accommodating a flight module support structure. These mounting fixture(s) can, for example, be located at one end of the positioning device, preferably at an outer end.

Preferably, the forked mounting fixtures each accommodate a support beam that is part of the support structure.

The forked mounting fixture can brace the support beam from below and hold it in place, ensuring a secure fixing as well as simple, precise alignment of the support structure and therefore the flight module.

The mounting fixture can optionally have one or several fixing element(s) for fixing the support beams into position. The fixing elements, for example, can be in the form of brackets that are closed tightly after the support beams are positioned in the forked mounting fixture. This locking function can prevent unwanted release of the support beam from the forked mounting fixture. Releasing the connection only takes place after the lock on the fixing elements has been released.

In accordance with further embodiments, several positioning devices can be placed in a star-shaped arrangement and/or at equal distance from each other. For example, the positioning devices can run outwards from a central point on the charging station in a star-shaped formation. The star-shaped arrangement and the equal distribution enable the weight of the flight module to be evenly distributed over the charging station, therefore enhancing the safety of the charging station.

The specific arrangement of the positioning devices depends on the design of the flight module, particularly its support structure. If the support structure, for example, has a hexagonal structure with six radial support beams running outwards, in a preferred embodiment six positioning devices can be provided whereby each positioning device is used to fix and align one of the six radial support beams. In this case, the positioning devices run outwards in a star whilst being equally spaced from each other, with two positioning devices having an angle of 60° to each other.

In accordance with various embodiments, the charging station, preferably the charging device and/or the positioning devices can feature a fiber-reinforced composite material or consist of such fiber-reinforced composite material.

The fiber-reinforced composite material can, for example, be a fiber-reinforced plastic such as carbon-fiber, fiberglass, or basalt-fiber reinforced plastic.

The fiber-reinforced plastic can have special textile fiber reinforcement elements. Textile fiber reinforcement can be in the form of flat or band-shaped textiles, knits, weaves, or mesh in a plastic matrix.

The use of fiber-reinforced composite materials improves the ratio of the stability and weight of the charging station or the construction elements of the charging station, as the construction elements made of fiber-reinforced composites have a low weight but also have good or very good mechanical properties such as strength, e-module, impact resistance.

The boom of the positioning devices can, for example, be rod-shaped or bar-shaped depending on the load and also have a solid or hollow profile cross-section.

If the booms have a hollow profile then it is possible, for example, to place electrical cables within them. As a result, cables for the charging device or signal lines for the communication systems can also be routed therein.

A combined charging station according to the invention for vertical take-off and landing aircraft with one or several energy stores comprises several of the charging stations described above.

If the aircraft each have a flight module that is as described above and can be handled in a modular fashion, the combined charging station according to the invention can be designed in accordance with various embodiments for flight modules of vertical take-off and landing aircraft. This combined charging station for flight modules with one or several energy stores also comprises several of the charging stations described above.

The above embodiments explain the charging station according to the invention as well as the combined charging station according to the invention. The advantages of the combined charging station according to the invention correspond to the advantages of the charging station according to the invention and their embodiments.

By combining several charging stations into a single combined charging station, it is possible to simultaneously charge the energy stores of several aircraft or flight modules.

The space requirements compared to several individual charging stations are reduced. In addition, only a single infrastructure connection is required, namely a single connection to a local power grid to provide electrical energy for several charging stations.

This provides efficient charging technology for charging up the aircraft or charging modules.

The individual charging stations can each have a charging platform, preferably a level charging platform, alongside the positioning device or devices and the charging device. The charging platform can be used to park an aircraft or store a flight module. The positioning device(s) and/or the charging device can be fastened on or next to the charging platform. The charging platform can, for example, correspond to the same spatial dimensions of the aircraft or flight module.

Alternatively or cumulatively for the use of a charging platform, the holders on the positioning devices can be used as supports for the aircraft or flight modules.

In accordance with various embodiments, the charging stations can move either vertically or horizontally, e.g. movable. The result can be an advantageous, space-saving arrangement of charging stations both with and without the aircraft or flight modules to be charged.

In accordance with further embodiments, the combined charging station can have a housing to enclose the charging stations. For example, the housing can fully enclose the charging station or, as a minimum, cover it from above.

The housing can have one or several openings. One or several openings on top can be provided for the vertical take-off or landing of the aircraft or the flight modules. One or several lateral openings can be provided for lateral extension and retraction of the positioning devices in order to move the aircraft or flight module into a position from which it can take off or to prepare for the landing of an expected aircraft/flight module.

The housing serves to protect the charging stations and the aircraft or flight modules from weather and other harmful external influences.

In accordance with various embodiments, the charging stations can be positioned in a rack arrangement e.g. vertically above each other in one or several rows arranged horizontally alongside each other. The positioning devices on the charging stations can be extended horizontally to both receive and release the aircraft/flight modules, enabling a vertical take-off or landing of the aircraft or flight module. The rack arrangement represents a particularly space-saving arrangement for the combined charging station.

The rack arrangement can be implemented with a rack system that, for example, can be in the form of a paternoster lift. In the form of a paternoster lift means that the charging stations are arranged in two vertically adjacent rows and can be moved in rotation—just like a paternoster lift. At the upper and lower turning point, the charging stations are moved into the other row.

In accordance with various embodiments, the charging stations can be positioned in a revolver arrangement. The charging stations can be arranged together on a base plate, e.g. a circular base plate that can rotate around preferably a vertical rotating axis. In order to release or receive, or to take off or land an aircraft/flight module, the relevant charging station can be moved into position in front of a lateral opening or below an upper opening in the housing of the combined charging station by means of the rotating base plate in order to bring the relevant aircraft/flight module to a position where it could take off, or to enable landing of the expected aircraft/flight module.

The revolver arrangement represents a further particularly space-saving arrangement for the combined charging station.

BRIEF DESCRIPTION OF THE DRAWINGS

Further advantages of the present invention can be seen in the drawings as well as the description. In schematic representations they show.

DETAILED DESCRIPTION OF EMBODIMENTS OF THE INVENTION

In the examples explained below, reference is made to the attached drawings that represent a part of the examples and in which specific embodiments are shown for the sake of clarity to demonstrate how the invention can be used. In this case, words indicating directions such as "above", "below", "in front of", "behind", "front", "rear" etc. are used referring to the orientation of the figures that are being described.

As elements of embodiments can be placed in a variety of different orientations, the terms indicating directions are used merely for clarification and are not restrictive in any way.

It is understood that other embodiments can be used and structural or logical modifications can be made without deviating from the scope of protection of the present invention. It is understood that the characteristics of the various embodiments described herein by way of example can be combined with each other if not specified to the contrary. The following detailed description is therefore not intended in a restrictive sense, and the scope of protection of the present invention is defined by the attached claims.

In this description, the terms "attached", "connected" and "coupled" are used to describe both a direct and an indirect attachment, a direct or indirect connection, and a direct or indirect coupling.

Identical or similar elements are given identical references in the figures in as far as this is expedient.

Figure 1:
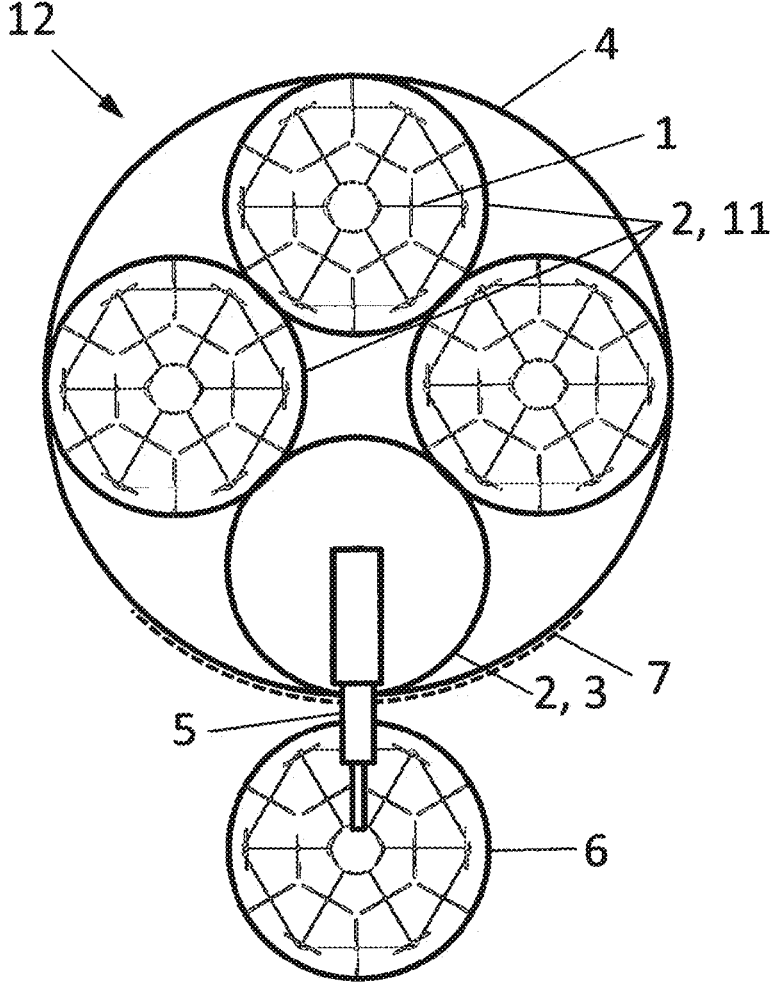
FIG. 1 a top view of a combined charging station according to the invention in a revolver arrangement with lateral opening.

FIG. 1 shows a first variant of a combined charging station (12) according to the invention for flight module (1) in a revolver arrangement of individual charging stations (2).

The combined charging station (12) comprises four charging stations (2), which are arranged on a rotating base plate (4). The charging stations (2) each have a charging platform on which a flight module (1) can be parked. In three of the four charging stations (2) there is a parked flight module (1) ready to be charged, whereby these charging stations (2) are located in a park position (11).

The combined charging station (12) has a housing with a lateral, closable opening (7).

The charging station (2) in front of the opening (7) is unoccupied and is in a standby position (3) to receive a flight module (1) into the charging station (2) or to release a flight module (1) from the charging station (2).

The combined charging station (12) has a positioning device (5) in the proximity of the opening (7) for holding, fixing, and aligning a flight module (1), whereby said device is designed as a telescopic device and is shown in an extended position in FIG. 1.

A flight module (1) is held in a take-off and landing position (6) on a positioning device (5) that is extended through the opening (7), whereby the flight module (1) is detected and aligned by the positioning device (5) from the landing approach or the flight module (1) is prepared for take-off.

The flight module (1) can be moved to the charging station (2) in the standby position (3) by means of the positioning device (5) and, if applicable, positioned on the charging platform of the charging station (2).

At this point the flight module (1) can be connected to a charging device (not shown) on the charging station (2) to charge.

An electrical connection of the flight module (1) with the charging device can be a standard electrical plug or the coupling device on the flight module (1), which is provided for coupling a transport module, and is also designed as an electrical coupling device.

At the same time, the charging device on the charging station (2) has a corresponding coupling counterpart which can be coupled to the coupling device on the flight module (1) and transfers electrical energy to the flight module (1).

Alternatively, the charging of the flight module (1) can take place inductively via coils.

The base plate (4) can be rotated during this process so that an adjacent charging station (2) that was previously located in the park position (11) is put in the standby position (3) in front of the opening (7).

The previously parked flight module (1) can be taken from the charging station (2) into the standby position (3) by means of the positioning device (5) and then moved into the take-off position (6) ready for take-off.

Figure 2:
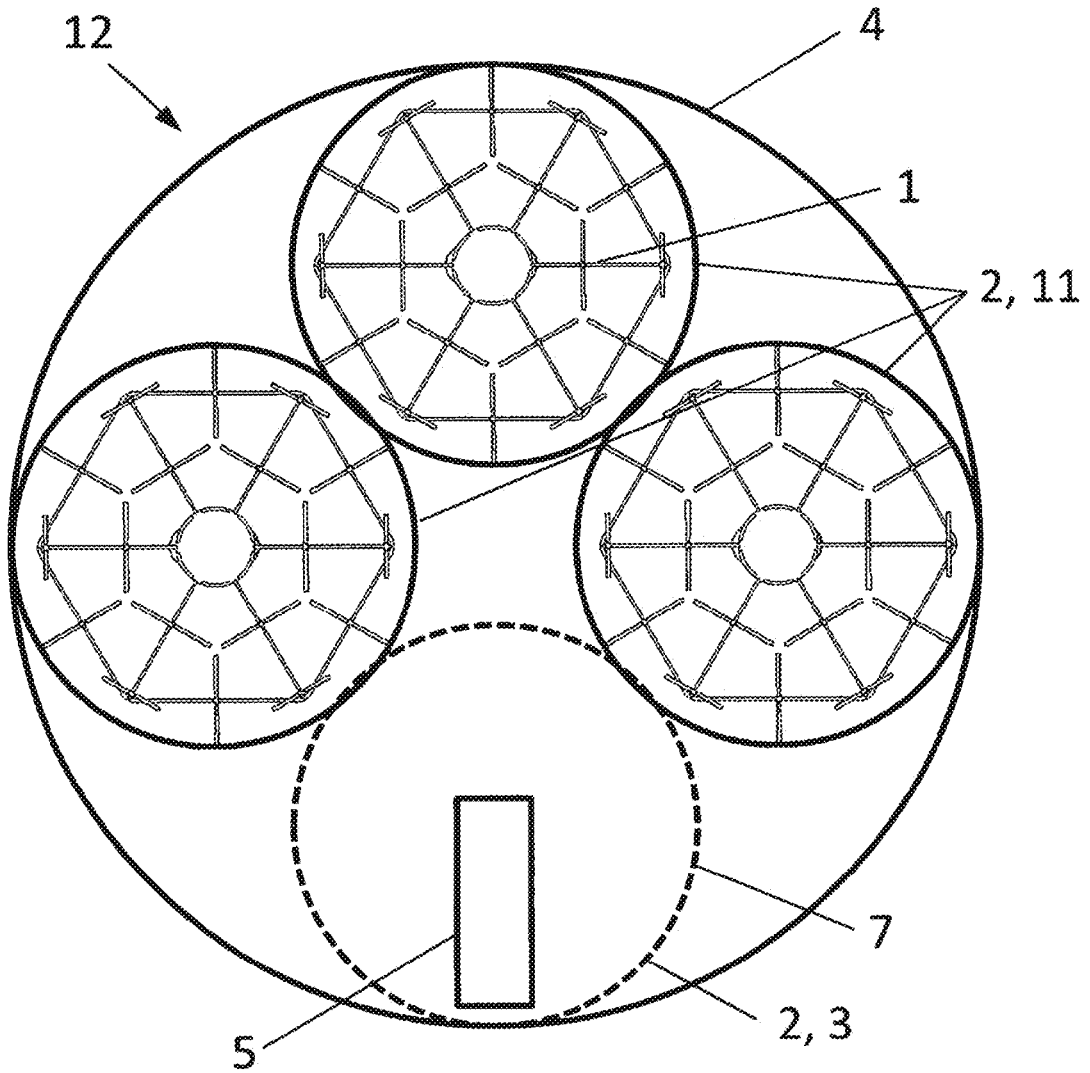
FIG. 2 a top view of a combined charging station according to the invention in a revolver arrangement with top opening.

FIG. 2 shows a second variant of a combined charging station (12) according to the invention in a revolver arrangement, similar to the combined charging station (12) according to FIG. 1.

The following text therefore only covers the differences compared to the embodiment in FIG. 1.

The combined charging station (12) has a housing with an upper, closable opening (7) in the roof of the housing.

The charging station (2) directly below the opening (7) is unoccupied and is in a standby position (3) to receive a flight module (1) into the charging station (2) or to release a flight module (1) from the charging station (2).

The combined charging station (12) has a positioning device (5) in the proximity of the opening (7) for holding, fixing, and aligning a flight module (1), whereby said device can be designed as a telescopic or stationary device.

A flight module (1) can be detected, held, and aligned on the positioning device (5) during the landing approach, then moved into the charging station (2) that is in the standby position (3) (not shown).

At this point the flight module (1) can be connected to a charging device (not shown) on the charging station (2) to charge.

The base plate (4) can be rotated during or after this process so that an adjacent charging station (2) that was previously in the park position (11) is put in the standby position (3) below the opening (7).

The flight module (1) previously in the park position (11) can be detected in the charging station (2) in the standby position (3) by means of the positioning device (5) and then moved into the take-off position (6) (not shown) ready for take-off.

Figure 3:
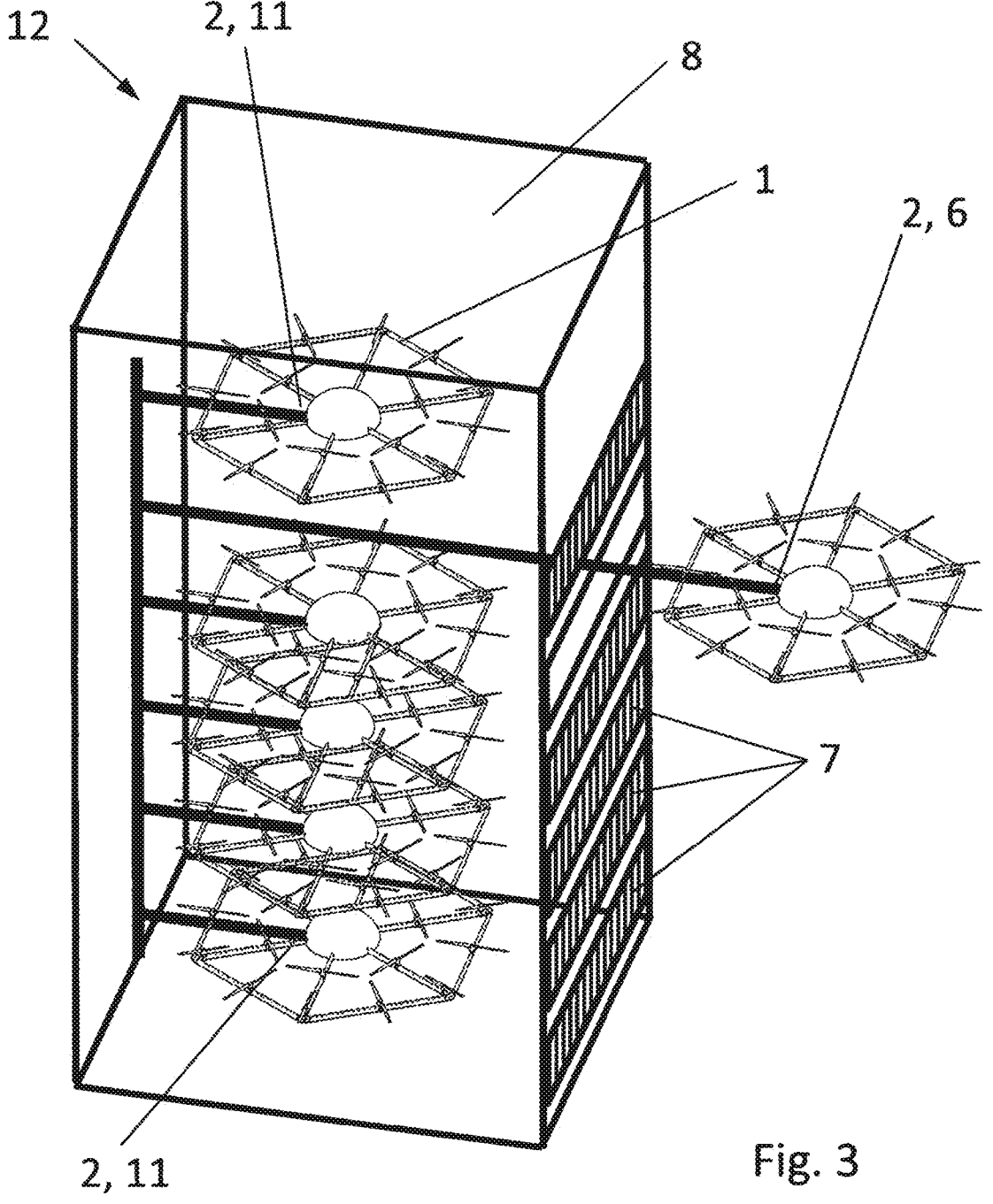
FIG. 3 a perspective view of a combined charging station according to the invention in a rack arrangement with lateral openings.

FIG. 3 shows a combined charging station (12) according to the invention for the flight module (1) in a rack arrangement with lateral openings.

The combined charging station (12) comprises six charging stations (2), which are arranged in a rack system (8) on top of each other in the style of a high-bay warehouse. There is a parked flight module (1) to be charged at each charging station (2), which is held in each case by a positioning device (5) that is part of charging stations (2). Five of the six charging stations (2) are in a park position (11).

The combined charging station (12) has a housing with six lateral, closable openings (7), which are each assigned to a charging station (2).

The positioning devices (5) on the charging stations (2) are shown here as a telescopic device. FIG. 3 shows the positioning device (5) of a charging station (2) in an extended position.

A flight module (1) is held in a take-off and landing position 6 on a positioning device (5) that is extended through a corresponding opening (7), whereby the flight module (1) is detected and aligned by the positioning device (5) from the landing approach or the flight module (1) is prepared for take-off.

The flight module (1) can be retracted into the housing by means of the positioning device (5).

The positioning device (5) can be connected to a charging device (not shown) so that the flight module (1) held at the positioning device (5) can be directly charged.

A standard electrical connector can be provided for the electrical connection of the flight module (1) to the charging device, or the coupling device on the flight module (1) can be simultaneously designed as an electrical coupling device, which has a corresponding coupling counterpart for the charging device. Alternatively, the charging of the flight module (1) can take place inductively via nozzles.

During this time, a parked, charged flight module (1) on another charging station (2) can be moved to the take-off and landing position (6) through the corresponding opening (7) by means the positioning device (5) of this charging station (2) ready for take-off.

Figure 4:
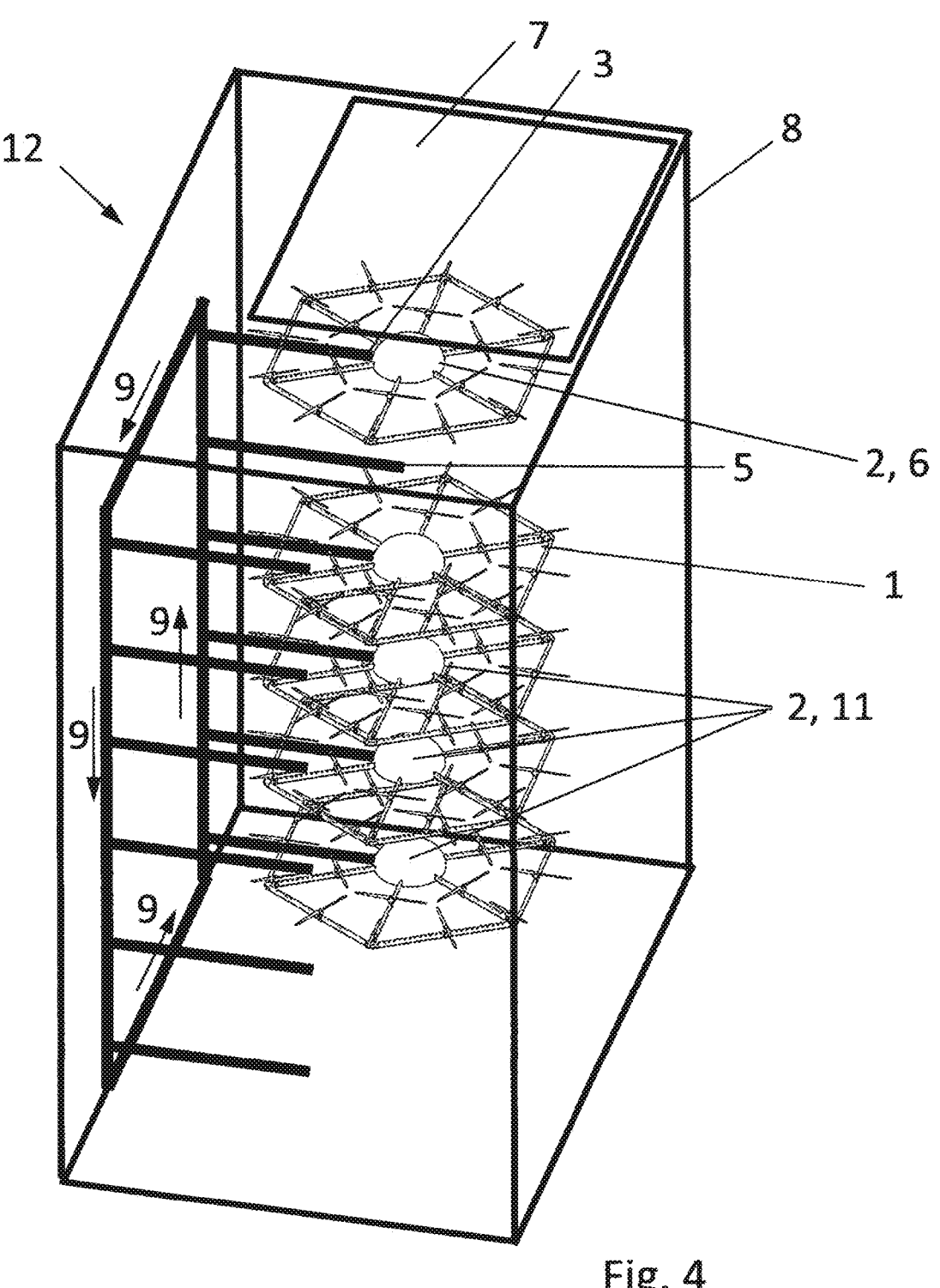
FIG. 4 a perspective view of a combined charging station according to the invention in a rack arrangement with top opening.

FIG. 4 shows a second variant of a combined charging station (12) according to the invention in a rack arrangement similar to the combined charging station (12) according to FIG. 3.

The following text therefore only covers the differences compared to the embodiment in FIG. 3.

The combined charging station (12) comprises twelve charging stations (2), which are arranged in a two-row rack system (8). There is a parked and a charging flight module (1) in a park position (11) at each of five charging stations (2), which are held in each case by a positioning device (5) that is part of the charging stations (2).

The combined charging station (12) has a housing with an upper, closable opening (7).

The rack system (8) is designed in the form of a paternoster lift, on which the charging stations (2) can be moved portably and flexibly to different locations in the transport direction (9).

As a result, each of the charging stations (2) can be positioned below the opening (7) and the flight module (1) held by the positioning device (5) can be moved to the take-off and landing position (6). Otherwise, an expected flight module (1) can be detected and aligned by means of the positioning device (5) of a charging station (2) that has moved upwards by means of the paternoster system and is now in the standby position (3) below the opening (7).

The charging process of the flight module (1) can take place as described above.

Figure 5:
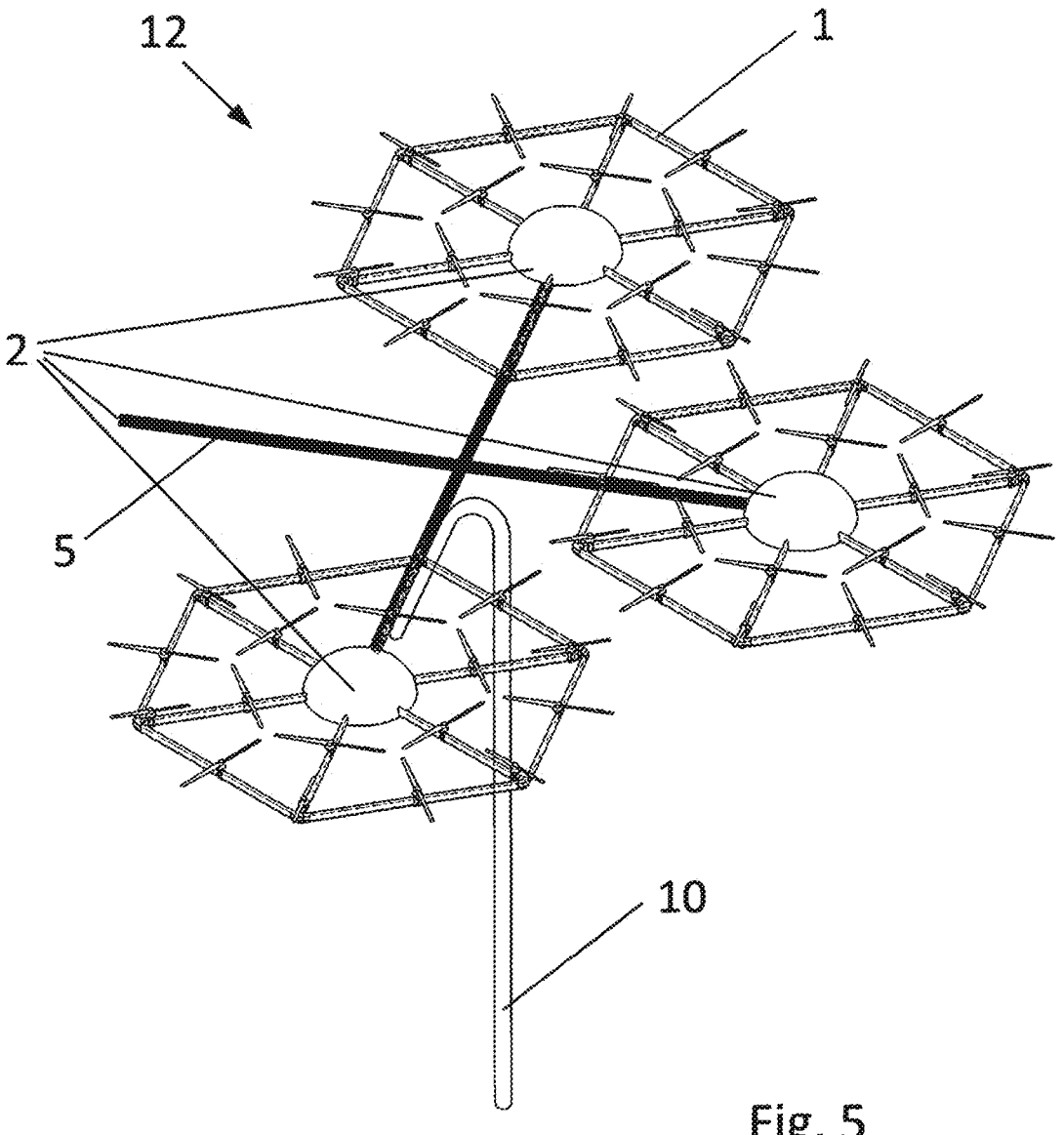
FIG. 5 a perspective view of a combined charging station according to the invention in a star-shaped arrangement on a lighting mast.

FIG. 5 shows a combined charging station (12) according to the invention with four charging stations (2) arranged in a star shape, arranged on a lighting column (10) of an existing infrastructure.

There is one flight module (1) to be parked and one to be charged on each of three charging stations (2), each of which is held and fixed in place by a positioning device (5) that is part of the charging stations (2).

The positioning devices (5) of the charging stations (2) are shown as a telescopic device.

When the telescopic positioning device (5) is in an extended position (not shown), the flight module can be moved to the take-off and landing position (6) or an expected flight module can be detected and aligned using the positioning device (5).

The charging process of the flight module (1) can take place as described above.

FIG. 5 also shows an embodiment of a single charging station (2) according to the invention with just one charging device and four positioning devices (5) arranged in a star shape each to hold, fix, and align a flight module (1), whereby only one flight module (1) of the four fight modules is charged via the charging device.

The phrase "and/or" used here, if it is used in a series of two or more elements, means that each of the listed elements can be used singly, or any combination of two or more of the listed elements can be used.

If, for example, a relationship is described which consists of components A, B and/or C then the relationship can relate to the components A on its own; B on its own; C on its own; A and B in combination; A and C in combination; B and C in combination; or A, B, and C in combination.

LIST OF REFERENCE NUMERALS

1 Flight module
2 Charging station
3 Standby position of the charging station
4 Rotating base plate
5 Positioning device
6 Take-off/landing position of the flight module
7 Closable opening
8 Rack system
9 Direction of movement of the paternoster rack system
10 Lighting column
11 Charging station park position
12 Combined charging station

What is claimed is:

1. A charging station, wherein the charging station is configured for charging one or more electrical energy stores of a flight module of a vertical take-off and landing aircraft, the aircraft comprising (i) the flight module which has a support structure with one or more drive units for driving the aircraft and (ii) a transport module for transporting people and/or loads that is reversibly couplable to the flight module and wherein the charging station comprises a charging device for transferring electrical energy to the one or more energy stores of the flight module that has landed at or on the charging station.

2. The charging station of claim 1, wherein the charging station further comprises one or more positioning devices for holding, fixing, and aligning the flight module of the aircraft, and wherein the one or more positioning devices hold the support structure of the flight module and align the flight module to enable an electrical connection between the flight module and the charging device.

3. The charging station of claim 2, wherein the one or more positioning devices comprise booms which have a hollow profile in which electrical cables of the charging device are arranged.

4. The charging station of claim 1, wherein the charging device comprises a connector which is configured for allowing a flexible connection of the charging device to the flight module.

5. The charging station of claim 1, wherein the charging device comprises a coupling counterpart which can be coupled to a coupling device of the flight module that is configured for coupling of a transport module such that electrical energy is transferred to the one or more energy stores via the coupling device of the flight module.

6. The charging station of claim 2, wherein the one or more positioning devices comprise one or more gripper and/or support devices for accommodating the support structure of the flight module of the aircraft.

7. The charging station of claim 2, wherein the one or more positioning devices comprise one or more forked mounting fixtures for accommodating support beams of the support structure of the flight module of the aircraft.

8. The charging station of claim 7, wherein the one or more positioning devices comprise one or more forked mounting fixtures in the form of brackets for accommodating the support beams of the support structure of the flight module.

9. The charging station of claim 2, wherein the positioning devices are arranged in a star-shaped arrangement and/or at equal distance from each other.

10. The charging station of claim 1, wherein the charging station comprises fiber-reinforced composite material or consists of fiber-reinforced composite material.

11. The charging station of claim 1, wherein the charging station is configured for arrangement on a lighting column, a pillar, or a roof.

12. A composite charging station, wherein the composite charging station comprises two or more charging stations according to claim 1.

13. The composite charging station of claim 12, wherein the two or more charging stations each comprise one or more positioning devices for holding, fixing, and aligning the flight module of the aircraft.

14. The composite charging station of claim 12, wherein the two or more charging stations are configured to be movable vertically and/or horizontally.

15. The composite charging station of claim 12, wherein the composite charging station further comprises a housing for enclosing the two or more charging stations.

16. The composite charging station of claim 12, wherein the two or more charging stations are positioned in a rack arrangement.

17. The composite charging station of claim 16, wherein the rack arrangement is formed by a rack system in the form of a paternoster lift.

18. The composite charging station of claim 12, wherein the two or more charging stations are positioned in a revolver arrangement.

19. The charging station of claim 8, wherein the brackets are configured to be capable of being closed after the support beams are positioned in the forked mounting structure.

* * * * *